3,242,127
COMPOSITIONS CONTAINING BLENDS OF AC-
RYLONITRILE POLYMERS AND SULFONATED
POLYSTYRENE
Howard G. Clark III, Chapel Hill, and John P. Knudsen,
Raleigh, N.C., assignors, by mesne assignments, to
Monsanto Company, a corporation of Delaware
No Drawing. Filed Aug. 17, 1961, Ser. No. 131,996
18 Claims. (Cl. 260—32.6)

This invention relates to novel fiber-forming polymer compositions, and particularly to blends of acrylonitrile-containing polymers with sulfonated styrene polymers.

The so-called acrylic fibers, made from polyacrylonitrile or from copolymers of generally 80 percent or more of acrylonitrile with one or more of numerous well-known mono-unsaturated monomers, have gained considerable commercial prominence in the past several years. Despite their many favorable properties, these fibers have required a great deal of effort to make them dyeable by known procedures with the common types of dyestuffs. A large number of expedients have been proposed to overcome this difficulty, but the problem still exists to a considerable extent and more effective means are still needed in the art to overcome it.

Perhaps, the most intractable dyeing problem presented by acrylic fibers is that of imparting affinity for basic dyes to the extent desired. The capability for deep dyeing with basic dyes has been avidly sought in that bright shades of color which can be obtained only with basic dyes are often demanded for textile fabrics. In general, basic dyes are characterized by the brilliancy of the colors they produce on textile fibers, and their great tinctorial power. A capability for dyeing with basic dyes is also desirable in order to facilitate cross and union dyeing of polyacrylonitrile yarns with wool (using acid dyes on wool) and with rayon (using direct dyes on the rayon).

The usual approach to improving the basic dye affinity of acrylic fibers in the past has been to incorporate sites for basic dyes in the polymer, i.e., by copolymerizing a basic dye receptive monomer or monomers with acrylonitrile. Although varying degrees of success have been achieved by this technique, there are inherent shortcomings to the general approach which cannot be overcome. For example, the affinity of acrylonitrile polymer yarns and fabrics for dyes in general decreases as the yarn in the course of manufacture is subjected to greater drawing. Because of the enhancement of tenacity and other important properties, it is desirable to use high draw ratios in fiber manufacture. Unfortunately, the greater extent to which the yarn is drawn, the more dense and the less penetrable it becomes to dyes. It follows then that incorporation of sites for basic dyes in the polymer does not necessarily provide adequate dyeability, because many of the sites provided may become inaccessible to the dye molecules. Another disadvantage is an inability to readily adjust the dye level desired for particular situations in that for a given polymer manufacture the number of dye sites therein cannot be altered. A further disadvantage is one of economics, in that techniques for incorporating dye sites into acrylonitrile polymers are usually expensive.

It is, therefore, an object of this invention to provide fiber-forming polymer compositions containing polyacrylonitrile and copolymers thereof having an extraordinarily excellent affinity for basic dyes.

It is a further object of this invention to provide a method for producing acrylic fibers of improved basic dyeability which is both effective and economical.

It is a still further object of this invention to provide a method for increasing the level of basic dye uptake of acrylic fibers, which level can be readily and easily adjusted.

Other objects of the invention will become apparent from the description which follows:

The above objects are attained by forming blend compositions of minor amounts of sulfonated polystyrene with fiber-forming acrylonitrile polymer compositions which contain greater than about 80 percent by weight of acrylonitrile.

The amount of sulfonated polystyrene which may be present in the blends can vary widely, for example, amounts ranging from about 0.3 to 15 percent by weight based on the total weight of the blend have been effectively used. The degree of sulfonation present in the styrene polymer employed and the dye uptake level desired will for the most part determine the amount to be used in any given situation. Although the degree of sulfonation is an important factor in the ultimate dye uptake of the blended composition in that it provides dye receptive sulfonic acid groups, the dye uptake level attainable is not attributable solely to this factor. Surprisingly, it has been observed that polystyrene, in and of itself, enhances the capability of the sulfonic acid groups for affixing dye molecules. Thus, it has been observed that attainable color build-up varied with the total quantity of polystyrene present in the blend as well as with the number of sulfonic acid groups present. For example, it was found that the presence of 5 percent by weight of polystyrene in the blend (9 percent sulfonated) was substantially more effective than was 0.5 percent by weight of polystyrene (90 percent sulfonated).

The sulfonated styrene polymers contemplated for use in this invention are characterized by their solubility in water and the common solvents employed in preparing spinning dopes for acrylic fiber manufacture. Methods for their preparation are known. In general, they comprise dissolving polystyrene in a liquid polychlorinated aliphatic hydrocarbon and then treating the solution with a highly reactive sulfonating agent. Among suitable solvents which may be employed are carbon tetrachloride, chloroform, tetrachloroethylene and methylene chloride, while sulfuric acid, sulfur trioxide and chlorosulfonic acid may be employed as sulfonating agents. A typical preparation follows:

In 300 parts of chloroform there was dissolved 40 parts of polystyrene. To this solution 300 parts of 95 percent sulfuric acid was added. An emulsion formed which was stirred and then heated to 60° C. for two hours. The resulting paste was then added to about 500 ml. of crushed ice and water. The polystyrene and chloroform settled out and the spent acid was decanted. Chloroform was separated from the sulfonated polystyrene product by steam distillation.

Practically any commercially available polystyrene, which products generally have molecular weights in excess of 50,000, may be employed in preparing useful sulfonates for the purpose of this invention. Although usually not available commercially, polystyrene of a lower molecular weight could likewise be employed. The degree of sulfonation imparted to these polymeric substances may be widely varied, for example, from about 5 to 100 percent based on one sulfonic acid group per unit of styrene monomer.

The acrylonitrile materials or our blend compositions are polymers of acrylonitrile including binary and ternary polymers containing at least 80 weight percent of acrylonitrile in the polymer molecule and up to 20 weight percent of monomers copolymerizable therewith; or blends comprising polyacrylonitrile or copolymers comprising acrylonitrile, the blend having an overall polymerized acrylonitrile content of at least 80 percent by weight as will be set forth in more detail hereinafter.

For example, the polymer may be a copolymer of from 80 to 98 percent acrylonitrile and from 2 to 20 percent of another monomer containing the >C=C< linkage and copolymerizable with acrylonitrile. Suitable mono-olefinic monomers include acrylic, alpha-chloroacrylic and methacrylic acids; the methacrylates, such as methyl methacrylate, ethyl methacrylate, butyl methacrylate, octyl methacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1 - chloro - 1 - bromomethylene; methacrylonitrile; acrylamide and methacrylamide, alpha-chloroacrylamide or monoalkyl substitution products thereof; methyl vinyl ketone; vinyl carboxylates such as vinyl acetate, vinyl chloroacetate, vinyl propionate and N-vinylsuccinimide; methylene malonic esters; itaconic acid and itaconic ester; N-vinylcarbazole; vinyl furane; alkyl vinyl ethers; vinyl sulfonic acid; ethylene alpha-, beta-dicarboxylic acids or their anhydrides or derivatives such as diethyl fumarate, diethyl maleate, diethyl citraconate, diethylmesaconate; styrene; vinyl naphthalene, acenaphthalene; vinyl-substituted tertiary heterocyclic amines, such as the vinylpyridines and alkyl-substituted vinylpyridines, for example, 2-vinylpyridine, 4-vinylpyridine, 5-methyl-2-vinylpyridine, etc., 1-vinylimidazole and alkyl-substituted 1-vinylimidazoles, such as 2-, 4-, or 5-methyl-1-vinylimidazole, and other >C=C< containing copolymerizable materials.

The polymer may be a ternary interpolymer, for example, products obtained by the interpolymerization of acrylonitrile and two or more of any of the monomers enumerated above. More specifically, a useful ternary polymer comprises acrylonitrile, vinyl acetate, and 2-methyl-5-vinylpyridine. The ternary polymers may contain, for example, from 80 to 98 percent of acrylonitrile, from 1 to 10 percent of a vinylpyridine or a 1-vinylimidazole, and from 1 to 18 percent of another substance, such as vinyl acetate, methyl acrylate, methacrylonitrile or vinyl chloride.

The polymer may also be a blend of from 50 to 98 weight percent polyacrylonitrile or an interpolymer of from 80 to 99 percent acrylonitrile and from 1 to 20 percent of at least one other >C=C< containing substance copolymerizable with acrylonitrile, blended with from 2 to 50 percent on the weight of the blend of a copolymer of from 30 to 90 percent of a vinyl-tertiary heterocyclic amine and 10 to 70 percent of at least one other >C=C< containing polymerizable monomer. Preferably, when the polymeric material comprises a blend, it will be a blend of a copolymer of 90 to 98 percent of acrylonitrile (more preferably 93 to 97 percent), and from 2 to 10 percent of another mono-olefinic monomer (more preferably 3 to 7 percent), such as vinyl acetate, with a sufficient amount of a copolymer of from 10 to 70 percent of acrylonitrile or N-vinylcarbazole and the like and from 30 to 90 percent of a vinyl-substituted tertiary heterocyclic amine, such as vinylpyridine, methyl vinylpyridine or 1-vinylimidazole, to give a blend having an overall vinyl-substituted tertiary heterocyclic amine content of from 2 to 10 percent and preferably about 6 percent, based on the weight of the blend.

Preparations for the just-described acrylonitrile polymer containing compositions are well known in the art with suspension polymerization techniques being generally preferred. When employed for fiber fabricating purposes, it is desirable that these materials have relatively high molecular weights, i.e., at least 10,000 and preferably between about 25,000 and 150,000.

The acrylonitrile and sulfur-containing polymers are mutually soluble in solvents of the dimethyl carbamyl type, such as N,N-dimethyl formamide and N,N-dimethyl acetamide, and they can be blended and solubilized in these solvents by straight-forward procedures. For example, the polymer components can be mixed in water dispersions, which mixture is then dried and introduced into the solvent; or they can be introduced directly into the solvent. In forming stable solutions, which are useful in large scale spinning operations, it is generally desirable to employ elevated temperatures with mechanical agitation. Heating up to the boiling point of the solvent may be employed to facilitate solution formation. Generally, good spinning performance is realized when these spinning solutions or "dopes" have a solids content (i.e., polymer content) of from 5 to 35 weight percent, preferably from 10 to 30 weight percent, based on the total weight of the solution.

Synthetic filaments and fibers are readily fabricated from the aforenoted solutions of the acrylonitrile and sulfur-containing polymer blends by employing the well known wet or dry spinning techniques. For example, when employing wet spinning the dope is extruded through the orifices of a spinnerette and into a coagulation bath containing water or a mixture of water and the dope solvent. In dry spinning a coagulation bath is not used, of course, since the dope is extruded into a chamber of heated air or the like to effect solvent evaporation. The spinning performance of these blended materials was found to be excellent without any necessity for departing from the standard spinning procedures normally employed for obtaining acrylic fibers. The fiber properties such as tenacity, elongation, etc., were fully comparable to those of standard acrylic fibers.

The following specific embodiments are illustrative of the methods and the resulting improved products of this invention.

*Example I*

A series of polymer blends were prepared by intimately mixing a base acrylonitrile-containing polymer with sulfonated polystyrene in varying amounts and containing varying degrees of sulfonation. The base polymer employed was a copolymer containing 95.5 percent by weight of acrylonitrile and 4.5 percent by weight of vinyl acetate. The copolymer had a specific viscosity ($\eta_{sp}$) of 0.25. The blends were prepared in the solvent N,N-dimethyl acetamide to give a dope having a solids content of 18 percent on the weight of the solution.

The quantities of sulfonated polystyrene used in each sample together with the percentage of sulfonation present in each instance is given in the table below. The percentage figure given for the sulfonated polystyrene is based on the weight of the total polymer blend, while the given percentage of sulfonation is based on one sulfonic acid group per unit of styrene monomer. The blended polymer compositions were formed into filaments by employing a conventional wet spinning procedure. That is, the spinning dopes were extruded into a coagulation bath containing a mixture of 55 percent N,N-dimethyl acetamide and 45 percent water.

After preparing the above-noted fiber samples, tests were conducted to compare the affinity for basic dyes of the sulfonated polystyrene containing blends of this invention against conventional acrylic fibers. The dyeings were made with a constant concentration of the commercial dye Sevron Blue, C.I. 4285. Standard procedures were used in a dyebath maintained at a pH of 5.3 and a temperature of from 210° F. to 212° F. with the dyeing time being two hours in length. The test results are given in the table following wherein the amount of dye absorbed by each test sample is expressed in terms of a percentage based on the weight of the fiber.

TABLE I

| Sample No. | Percent Sulfonated Polystyrene in Blend | Percent Sulfonation of Polystyrene | Percent Basic Dye Absorbed |
| --- | --- | --- | --- |
| 1 (control) | none | | 2.8 |
| 2 | 1.0 | 96.5 | 4.55 |
| 3 | 1.5 | 70.6 | 5.1 |
| 4 | 2.67 | 37.5 | 6.4 |
| 5 | 5.0 | 22.5 | 7.5 |
| 6 | 10.0 | 9.6 | 11.9 |

From the above experimental data, it is observed that the acrylic fiber samples which contained sulfonated polystyrene absorbed from roughly 60 to 350 percent more basic dye than the control sample consisting of the same acrylonitrile-containing base polymer but devoid of sulfonated polystyrene. Noteworthy is the comparison between the rests of test Sample 2 with that of test Sample 6. 6. It is seen that fiber Sample 2 contained one percent polystyrene which was 96.5 percent sulfonated, whereas Sample 6 contained 10 percent polystyrene having a degree of sulfonation equivalent to 9.6 percent based on one sulfonic acid group per styrene monomer unit. Thus, it is apparent that these two fiber samples contained substantially equivalent numbers of dye receptive sulfonic acid groups; however, they differed with respect to polystyrene content, i.e., Sample 6 contained ten times more polystyrene than did Sample 2. Since Sample 6 absorbed better than 350 percent more dye than did Sample 2, it becomes clearly evident that the polystyrene polymer acts not merely as a carrier for the dye receptive sulfonic acid groups but obviously contributes to the basic dye absorbing capability.

Example II

Another series of polymer blends were prepared as in Example I. However, the base polymer employed in this series was a copolymer containing 93 percent by weight of acrylonitrile and 7 percent by weight of vinyl acetate. This polymer had a specific viscosity ($\eta_{sp}$) of 0.15. As in Example I, the polymers were blended in the solvent N,N-dimethyl acetamide. In each case the dopes prepared had a solids content of 25 percent on the weight of the solution.

The quantities of sulfonated polystyrene present in each test fiber sample together with the percentage of sulfonation of the polystyrene employed is given in Table II below. As in Table I above, the percentage figure given for the sulfonated polystyrene is based on the weight of the total polymer blend, while the given percentage of sulfonation is based on one sulfonic acid group per unit of styrene monomer. Fibers were wet spun from the blended polymeric compositions and were thereafter tested for basic dye uptake in accordance with the procedure as set out hereinabove for Example I. Again, the figure given for the dye absorbed for each test sample is expressed in terms of a percentage based on the weight of the fiber.

TABLE II

| Sample No. | Percent Sulfonated Polystyrene in Blend | Percent Sulfonation of Polystyrene | Percent Basic Dye Absorbed |
| --- | --- | --- | --- |
| 1 (control) | none | | 7.6 |
| 2 | 0.5 | 96.5 | 9.75 |
| 3 | 0.8 | 70.6 | 10.4 |
| 4 | 1.34 | 37.5 | 12.2 |
| 5 | 5.0 | 22.5 | 14 |
| 6 | 2.5 | 22.5 | 10.4 |
| 7 | 5.0 | 9.6 | 12.6 |

Example III

When an acrylonitrile terpolymer containing approximately 86 percent by weight of acrylonitrile, 7 percent by weight of vinyl acetate and 7 percent by weight of methylvinylpyridine is blended with polystyrene sulfonated to an extent of about 70 percent, such that the sulfonated polystyrene is present in the blend in an amount of about one percent based on the total weight of the blend, fibers which are spun from this composition and thereafter dyed with the basic dye Sevron Blue, C.I. 4285, they will absorb from about 50 to 100 percent more dyestuff than fibers containing the same acrylonitrile terpolymer but devoid of any sulfonated polystyrene content. That is, the fibers containing the sulfonated polystyrene will contain a deep blue coloration while those not containing this substituent will be only stained or lightly colored.

Example IV

When an acrylonitrile-containing copolymer blend of (A) a copolymer of 94 percent acrylonitrile and 6 percent vinyl acetate and (B) a copolymer of 50 percent acrylonitrile and 50 percent 2-methyl-5-vinylpyridine, said blend containing 6 percent 2-methyl-5-vinylpyridine based on the total weight of the blend, is further blended with polystyrene sulfonated to an extent of 70 percent, such that the sulfonated polystyrene is present in the blend in an amount of one percent based on the weight of the total blend, fibers spun from this composition and thereafter dyed with the basic dye Sevron Blue C.I. 4285 will absorb approximately 50 to 100 percent more dyestuffs than will fibers containing the same acrylonitrile copolymer blend but lacking any sulfonated polystyrene content.

Example V

When a polyacrylonitrile homopolymer is blended with 3 percent by weight based on the total weight of the blend of polystyrene sulfonated to a degree of 70 percent, fibers spun from this composition and thereafter dyed with the basic dye Sevron Blue, C.I. 4285 will absorb sufficient dye to give a deep blue coloration, while the polyacrylonitrile homopolymer will merely be stained following the same dyeing operation.

Example VI

The polymeric materials of this invention may also be blended and solubilized in other dimethyl carbamyl type solvents, such as, for example, N,N-dimethyl formamide. Thus, a highly satisfactory spinning dope is prepared by first mixing a copolymer having a specific viscosity ($\eta_{sp}$) of 0.15 and containing 94 weight percent acrylonitrile and 6 weight percent vinyl acetate with N,N-dimethyl formamide employing quantities sufficient to provide a total solids content of 30 percent by weight. The mixture is then agitated and heated to effect solution.

A second solution, also having a solids content of 30 percent by weight is prepared in the same manner as that above by dissolving a sulfonated polystyrene polymer (22.5 percent sulfonation, based on one sulfonic acid group per unit of styrene monomer) in N,N-dimethyl formamide. The two solutions are then blended in amounts of 95 percent by volume of the former and 5 percent by volume of the latter. The resulting mixtures are compatible and the ultimate solution formed is stable and useful in spinning operations.

It will be apparent to those skilled in the art that many different embodiments of this invention can be made without departing from the spirit and scope thereof; consequently, it is not intended that the invention shall be limited by the description thereof but only as indicated in the appended claims.

We claim:
1. A composition of matter comprising from 85 to 99.7 weight percent of a polymeric composition selected from the group consisting of (A) polyacrylonitrile, (B) a copolymer of from 80 to 98 weight percent acrylonitrile and from 2 to 20 weight percent of at least one other monoolefinic monomer copolymerizable therewith, (C) a polymer blend of a copolymer of 80 to 99 weight percent acrylonitrile and 1 to 20 weight percent of another mono-olefinic monomer and a copolymer of 10 to 70 weight percent acrylonitrile and 30 to 90 weight percent of a vinyl-substituted tertiary heterocyclic amine, said polymer blend having an overall vinyl-substituted tertiary heterocyclic amine content of 2 to 10 percent based on the weight of the blend, intimately blended with from 0.3 to 15 weight percent of sulfonated polystyrene.

2. A composition of matter comprising from 85 to 99.7 weight percent of polyacrylonitrile intimately blended with from 0.3 to 15 weight percent of sulfonated polystyrene.

3. A composition of matter comprising from 85 to 99.7 weight percent of a copolymer containing from 80 to 98 weight percent acrylonitrile and from 2 to 20 weight percent of another mono-olefinic monomer copolymerizable therewith, intimately blended with from 0.3 to 15 weight percent of sulfonated polystyrene.

4. A composition of matter comprising from 85 to 99.7 weight percent of a copolymer containing from 80 to 98 weight percent acrylonitrile and from 2 to 20 weight percent of vinyl acetate intimately blended with from 0.3 to 15 weight percent of sulfonated polystyrene.

5. A composition of matter comprising from 90 to 99.5 weight percent of a copolymer of 95.5 weight percent acrylonitrile and 4.5 weight percent vinyl acetate intimately blended with from 0.5 to 10 weight percent of sulfonated polystyrene.

6. A composition of matter comprising from 90 to 99.5 weight percent of a copolymer of 93 weight percent acrylonitrile and 7 weight percent vinyl acetate intimately blended with from 0.5 to 10 weight percent of sulfonated polystyrene.

7. A composition of matter comprising from 85 to 99.7 weight percent of a polymer blend of (A) a copolymer containing from 80 to 99 weight percent acrylonitrile and 1 to 20 percent of another mono-olefinic monomer copolymerizable therewith and (B) a copolymer containing 10 to 70 weight percent acrylonitrile and 30 to 90 weight percent of a vinyl-substituted tertiary heterocyclic amine, said polymer blend having an overall vinyl-substituted tertiary heterocyclic amine content of from 2 to 10 percent based on the weight of the blend, said polymer blend being intimately blended with from 0.3 to 15 weight percent of sulfonated polystyrene.

8. A composition of matter comprising from 85 to 99.7 weight percent of a polymer blend of (A) a copolymer containing from 80 to 99 weight percent acrylonitrile and 1 to 20 weight percent of vinyl acetate and (B) a copolymer containing 10 to 70 weight percent acrylonitrile and 30 to 90 weight percent of a vinylpyridine, said polymer blend having an overall pyridine content of from 2 to 10 percent based on weight of the blend, said polymer blend being intimately blended with from 0.3 to 15 weight percent of sulfonated polystyrene.

9. A composition of matter comprising 90 to 99.5 weight percent of a polymer blend of a copolymer of (A) 94 weight percent acrylonitrile and 6 weight percent vinyl acetate and (B) a copolymer of 50 weight percent acrylonitrile and 50 weight percent 2-methyl-5-vinylpyridine, the polymer blend having an overall 2-methyl-5-vinylpyridine content of 2 to 10 percent based on the weight of the blend, said polymer blend being intimately blended with from 0.5 to 10 weight percent of sulfonated polystyrene.

10. A composition of matter comprising from 85 to 99.7 weight percent of a terpolymer having at least 80 weight percent of acrylonitrile, from 2 to 10 weight percent of a vinyl-substituted tertiary heterocyclic amine and up to 18 percent of another polymerizable mono-olefinic monomer, intimately blended with from 0.3 to 15 weight percent of sulfonated polystyrene.

11. A composition of matter comprising from 85 to 99.7 weight percent of a terpolymer having at least 80 weight percent of acrylonitrile, from 2 to 10 weight percent of methylvinylpyridine and up to 18 percent of vinyl acetate, intimately blended with from 0.3 to 15 weight percent of sulfonated polystyrene.

12. A composition of matter comprising from 90 to 99.5 weight percent of a terpolymer containing 86 weight percent of acrylonitrile, 7 weight percent of methylvinylpyridine and 7 weight percent of vinyl acetate, intimately blended with from 0.5 to 10 weight percent of sulfonated polystyrene.

13. A method for preparing spinning dopes useful in the fabrication of fibers having an improved receptivity for basic dyes which comprises intimately mixing (1) a polymeric material selected from the group consisting of (A) polyacrylonitrile, (B) a copolymer of from 80 to 98 weight percent acrylonitrile and from 2 to 20 weight percent of at least one other mono-olefinic monomer copolymerizable therewith, (C) a polymer blend of a copolymer of 80 to 99 weight percent acrylonitrile and 1 to 20 weight percent of another mono-olefinic monomer and a copolymer of 10 to 70 weight percent acrylonitrile and 30 to 90 weight percent of a vinyl-substituted tertiary heterocyclic amine, said polymer blend having an overall vinyl-substituted tertiary heterocyclic amine content of 2 to 10 percent based on the weight of the blend, (2) sulfonated polystyrene and (3) a dimethyl carbamyl solvent; (1) being present in an amount of from 85 to 99.7 weight percent and (2) in an amount of from 0.3 to 15 weight percent, both percentages being based on the total weight of (1) and (2); the total weight of (1) and (2) being from 5 to 35 percent by weight based on the weight of the resulting mixture of (1), (2) and (3); and thereafter heating the mixture to effect solution.

14. The method of claim 13 wherein said solvent is N,N-dimethyl formamide.

15. The method of claim 13 wherein said solvent is N,N-dimethyl acetamide.

16. A method for preparing spinning dopes useful in the fabrication of fibers having an improved receptivity for basic dyes which comprises intimately mixing (1) polyacrylonitrile, (2) sulfonated polystyrene and (3) a dimethyl carbamyl solvent; (1) being present in an amount of from 85 to 99.7 weight percent and (2) in an amount of from 0.3 to 15 weight percent, both percentages being based on the total weight of (1) and (2); the total weight of (1) and (2) from 5 to 35 percent by weight based on the weight of the resulting mixture of (1), (2) and (3); and thereafter heating the mixture to effect solution.

17. A method for preparing spinning dopes useful in the fabrication of fibers having an improved receptivity for basic dyes which comprises intimately mixing (1) a copolymer of from 80 to 98 weight percent acrylonitrile and from 2 to 20 weight percent of at least one other mono-olefinic monomer copolymerizable therewith, (2) sulfonated polystyrene and (3) a dimethyl carbamyl solvent; (1) being present in an amount of from 85 to 99.7 weight percent and (2) in an amount of from 0.3 to 15 weight percent, both percentages being based on the total weight of (1) and (2), the total weight of (1) and (2) being from 5 to 35 percent by weight based on the weight of the resulting mixture of (1), (2) and (3); and thereafter heating the mixture to effect solution.

18. A method for preparing the spinning dopes useful in the fabrication of fibers having an improved receptivity for basic dyes which comprises intimately mixing (1) a polymer blend of a copolymer of 80 to 99 weight percent acrylonitrile and 1 to 20 weight percent of another mono-olefinic monomer and a copolymer of 10 to 70 weight percent acrylonitrile and 30 to 90 weight percent of a vinyl-substituted tertiary heterocyclic amine, said polymer blend having an overall vinyl-substituted tertiary heterocyclic amine content of 2 to 10 percent based on the weight of the blend, (2) sulfonated polystyrene and (3) a dimethyl carbamyl solvent; (1) being present in an amount of from 85 to 99.7 weight percent and (2) in an amount of from 0.3 to 15 weight percent, both percentages being based on the total weight of (1) and (2); the total weight of (1) and (2) being from 5 to 35 percent by weight based on the weight of the resulting mixture of (1), (2) and (3); and thereafter heating the mixture to effect solution.

References Cited by the Examiner

UNITED STATES PATENTS

| | | | |
|---|---|---|---|
| 2,604,456 | 7/1952 | Signer | 260—29.6 |
| 2,613,195 | 10/1952 | Craig | 260—45.5 |
| 2,676,896 | 4/1954 | Cohen et al. | 260—45.5 |
| 2,709,163 | 5/1955 | Couper et al. | 260—79.3 |
| 2,822,386 | 2/1958 | Nix | 8—55 |
| 2,955,009 | 10/1960 | Pitts | 8—55 |
| 3,026,288 | 3/1962 | Murdock et al. | 260—29.6 |

MORRIS LIEBMAN, *Primary Examiner.*
WILLIAM H. SHORT, *Examiner.*